US010562451B2

(12) United States Patent
Elliott

(10) Patent No.: US 10,562,451 B2
(45) Date of Patent: Feb. 18, 2020

(54) ENTITY DETECTION AND ALERT NOTIFICATION

(71) Applicant: International Business Machines Corporation, Armonk, NY (US)

(72) Inventor: Mark E. Elliott, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/988,552

(22) Filed: May 24, 2018

(65) Prior Publication Data
US 2019/0359129 A1 Nov. 28, 2019

(51) Int. Cl.
B60Q 1/00 (2006.01)
B60Q 9/00 (2006.01)

(52) U.S. Cl.
CPC .................... B60Q 9/00 (2013.01)

(58) Field of Classification Search
CPC ............ B60Q 9/00; B60Q 1/00; G08B 23/00
See application file for complete search history.

(56) References Cited

U.S. PATENT DOCUMENTS

| 6,396,403 | B1 | 5/2002 | Haner |
| 7,378,979 | B2 | 5/2008 | Rams, Jr. |
| 7,446,664 | B2 | 11/2008 | White |
| 7,733,228 | B2 | 6/2010 | Lee et al. |
| 8,659,414 | B1 | 2/2014 | Schuk |
| 8,841,997 | B2 | 9/2014 | Silveira |
| 2009/0079557 | A1 | 3/2009 | Miner |
| 2013/0263411 | A1* | 10/2013 | Jagodzinski ............ B60R 22/48 24/633 |
| 2014/0015664 | A1 | 1/2014 | Watson |
| 2014/0253314 | A1* | 9/2014 | Rambadt ................ B60N 2/002 340/457.1 |
| 2014/0361889 | A1 | 12/2014 | Wall et al. |
| 2015/0137962 | A1* | 5/2015 | Binnicker ................ B60Q 9/00 340/457 |
| 2016/0196732 | A1* | 7/2016 | Jones ....................... B60Q 9/00 340/686.6 |
| 2016/0200250 | A1* | 7/2016 | Westmoreland ......... B60Q 9/00 340/457.1 |

(Continued)

OTHER PUBLICATIONS

"AirON—ReThinking How a Light Switch Should Work", Indiegogo, Dallas, Texas, 12 pages, retrieved from internet: May 21, 2018: https://www.indiegogo.com/projects/airon-rethinking-how-a-light-switch-should-work##.

Primary Examiner — Phung Nguyen
(74) Attorney, Agent, or Firm — William Stock; Edell, Shapiro & Finnan, LLC

(57) ABSTRACT

According to embodiments of the present invention, a notification is provided to a user. A receptacle receives an engaging member of a securing device that engages an entity within an environment. The receptacle includes a sensor to detect a presence of the engaging member of the securing device within the receptacle. An alert unit is disposed within the receptacle and enabled in response to presence of the engaging member of the securing device within the receptacle. A communication device of the alert unit communicates with a target device associated with a user. A processor of the alert unit is configured to determine a distance to the user based on communication with the target device and control notification to the user in response to the distance to the user satisfying a threshold distance.

18 Claims, 5 Drawing Sheets

(56) References Cited

U.S. PATENT DOCUMENTS

2017/0001560 A1* 1/2017 Roisen ................ G08B 21/24
2017/0247015 A1* 8/2017 Davis .................. G08B 25/08
2018/0009376 A1* 1/2018 Johnson ............... B60Q 9/00
2018/0025604 A1* 1/2018 Protopsaltis ....... G08B 21/0205
340/457

* cited by examiner

ENTITY DETECTION AND ALERT NOTIFICATION

BACKGROUND

1. Technical Field

Present invention embodiments relate to detection and notification systems, and more specifically, to detecting a presence of an entity (e.g., person, animal, item, etc.) within a vehicle or other environment and providing a notification to a user.

2. Discussion of the Related Art

Parents, guardians, and other child care providers are responsible for protecting the health and wellbeing of children. Unfortunately, there are occasions when child care providers become distracted, forget, and/or unintentionally overlook a child in a vehicle. These situations can result in devastating consequences since vehicle temperatures may easily cause injury or death within a short duration. For example, summer heat may effectively enable the vehicle to assimilate conditions of an oven, while winter weather may provide a freezing cold environment in the vehicle, thereby providing unsafe environments for a child.

SUMMARY

According to embodiments of the present invention, a notification is provided to a user. A receptacle receives an engaging member of a securing device that engages an entity within an environment. The receptacle includes a sensor to detect a presence of the engaging member of the securing device within the receptacle. An alert unit is disposed within the receptacle and enabled in response to presence of the engaging member of the securing device within the receptacle. A communication device of the alert unit communicates with a target device associated with a user. A processor of the alert unit is configured to determine a distance to the user based on communication with the target device and control notification to the user in response to the distance to the user satisfying a threshold distance.

BRIEF DESCRIPTION OF THE DRAWINGS

Generally, like reference numerals in the various figures are utilized to designate like components.

DETAILED DESCRIPTION

Present invention embodiments pertain to detecting a presence of an entity (e.g., person, animal, item (e.g., perishable or other item, etc.), etc.) within a vehicle or other environment, and providing a notification to a user in response to the user exceeding a desired range or distance from the entity. For example, an embodiment of the present invention may notify a child care provider of a child remaining within a vehicle.

Present invention embodiments automatically enable and disable the detection and notification of an entity to a user. Devices associated with the entity and a user may be paired or linked together to detect a distance between the paired devices (and, hence, the user and entity). An alert notification is triggered when the distance between the paired devices (and, consequently, the user and entity) exceeds a specified threshold distance. Present invention embodiments may be automatically enabled and disabled, and provide automatic notifications or alarms to the user based on distance between the paired devices.

An embodiment of the present invention may include an entity alert system that detects when a child has been buckled into a seat within a vehicle, and uses pairing or linking of devices (respectively associated with the child and child care provider) to determine distances between the child and child care provider. Once the entity alert system has been activated, and the paired devices exceed a threshold distance (e.g., the child care provider exceeds a threshold distance from the seat), an alert is triggered. The entity alert system uses an integrated set of components and switches embedded in a safety restraint device (e.g., a seat belt, a restraining belt of a child safety seat, etc.). The entity alert system may be a standalone system, or may be integrated into a vehicle. The combination of these elements provides a mechanism for enabling and disabling the entity alert system for triggering notifications.

Figure 1A:
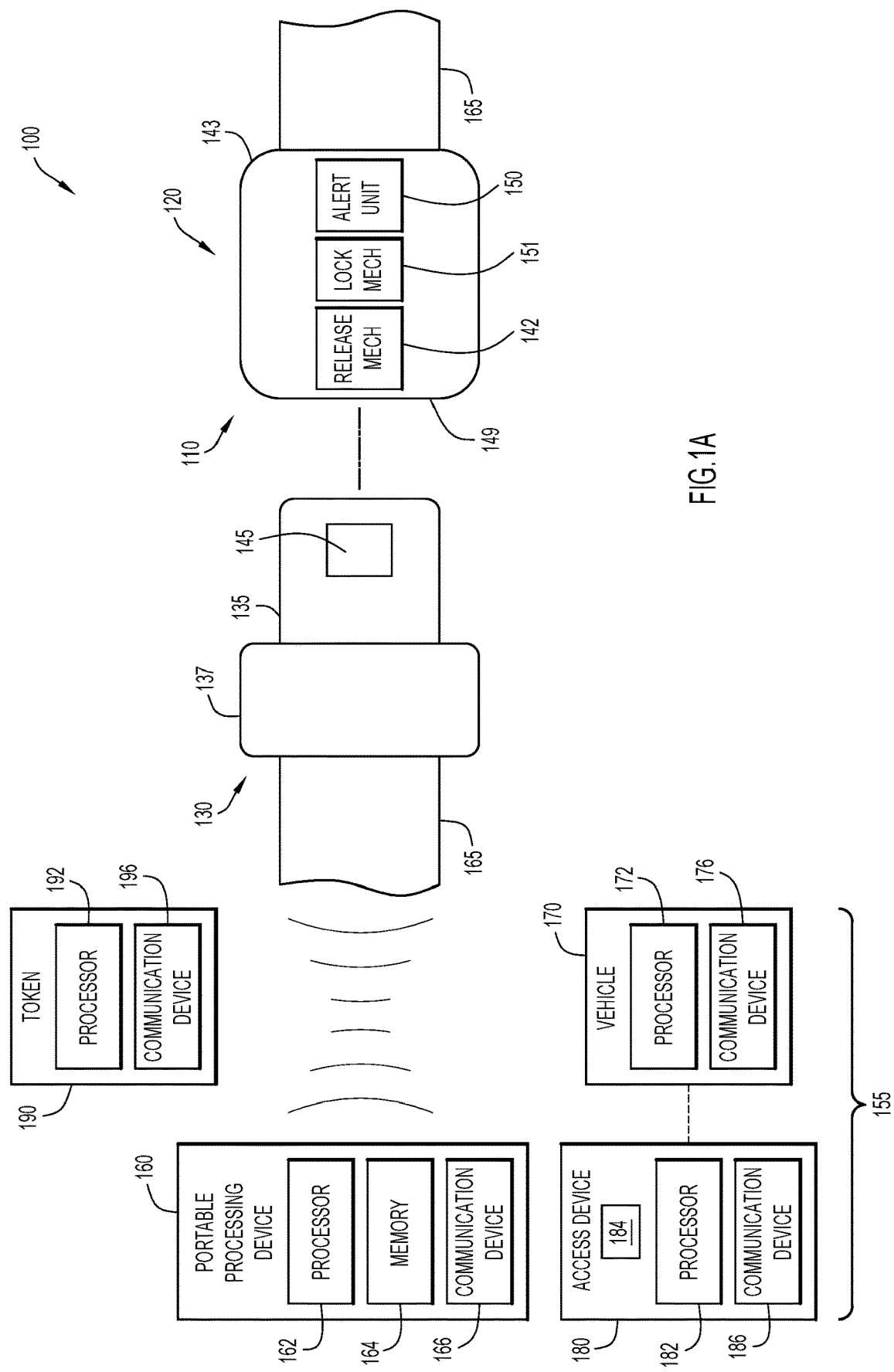
FIG. 1A is a diagrammatic illustration of an entity alert system to detect a presence of an entity within an environment and provide a notification to a user according to an embodiment of the present invention.

An embodiment of an entity alert system 100 according to an embodiment of the present invention is illustrated in FIG. 1A. Specifically, the entity alert system includes a securing device 110 and one or more target or user devices 155. The securing device may be utilized to secure an entity (e.g., person, etc.) within a vehicle 170 or other environment. Alternatively, the securing device may be attached to an entity (e.g., animal, perishable or valuable item, etc.) within the vehicle or other environment. An alert unit 150 is disposed within securing device 110 and pairs or links to target or user devices 155 (e.g., via a processor 230 and a communication device 225 (FIG. 2A)) for communication. The alert unit facilitates a notification to a user in response to the paired device (or user) exceeding a desired or threshold distance from the vehicle (or entity) as described below.

Securing device 110 includes a receptacle 120 and an engaging member 130. The receptacle and engaging member are each secured to a distal end of a respective belt or strap 165 to secure, or be attached to, an entity within the vehicle or other environment. The respective belts 165 associated with the receptacle and engaging member may be different belts, or be different portions of a same elongated belt (e.g., to form a loop to secure or be attached to an entity, etc.). Engaging member 130 includes a generally rectangular base 137 attached to a distal end of a respective belt 165, and a generally rectangular projection 135 extending distally of the base. The projection includes a generally rectangular aperture 145 for engagement with receptacle 120. However, the base, projection, and aperture may be of any shape or size.

Receptacle 120 is attached to a distal end of a respective belt 165, and includes a generally rectangular housing 143 with a generally rectangular slot 149 defined therein to receive projection 135, and a locking mechanism 151 disposed within the housing. However, the housing and slot may be of any shape or size, and the slot may be defined at any location. The locking mechanism engages aperture 145 of projection 135 and secures the engaging member to receptacle 120. Alert unit 150 is disposed within receptacle 120, and activated in response to insertion of engaging member 130 within the receptacle as described below.

The receptacle further includes a release mechanism or button 142 to enable the locking mechanism to release projection 135 of engaging member 130. By way of example, securing device 110 may include a vehicle seat belt with receptacle 120 including a seatbelt buckle and engaging member 130 including a tongue. Alternatively, the engaging member and receptacle may be utilized in a restraint for a child safety seat. However, alert unit 150 may be disposed at any location within any connectors of any suitable securing device (e.g., collar for an animal, band fastened to an item, belt buckle type arrangement, clasp or clamp arrangement, etc.).

User devices 155 include a portable processing device 160 (e.g., smartphone, tablet, personal digital assistant (PDA), laptop, etc.), vehicle 170 (e.g., automobile, truck, van, etc.), an access device 180 (e.g., vehicle manufacturer provided keyless entry remote or fob, etc.), and a token 190 (e.g., a stand-alone token or fob, etc.).

Portable processing device 160 may be implemented by various processing devices (e.g., smartphone, tablet, personal digital assistant (PDA), laptop, notebook, etc.), and may include any conventional or other computing systems preferably equipped with a display or monitor, a base, optional input devices (e.g., a keyboard, mouse or other input device), and any commercially available and custom software (e.g., communications software, operating system, etc.). The base includes at least one hardware processor 162 (e.g., microprocessor, controller, central processing unit (CPU), etc.), one or more memories 164, and a communication device 166. Communication device 166 may include any conventional or other components to transmit and receive communication signals (e.g., receiver, transmitter, transceiver, etc.), and preferably implements wireless communication protocols (e.g., BLUETOOTH, etc.). However, any types of communication utilizing any communication protocols may be employed. For example, communication device 166 may employ conventional or other BLUETOOTH low energy (BLE) devices (e.g., BLUETOOTH beacons, etc.) to communicate with nearby portable electronic devices. The BLUETOOTH beacon is a type of transmitter that transmits a universally unique identifier (UUID) and other information (e.g., transmitted signal power at a predetermined distance, etc.) recognizable by an associated application or software module on the nearby electronic device. This information may be used to determine the distance between the communicating devices.

Vehicle 170 is preferably implemented by an automotive vehicle (e.g., automobile, van, truck, etc.), but may be any type of vehicle. The vehicle may include a hardware processor 172 (e.g., microprocessor, controller, central processing unit (CPU), etc. with one or more memories), and a communication device 176. Processor 172 may be integrated with, or coupled to, communication device 176 to perform functions of the vehicle according to present invention embodiments. Communication device 176 may include any conventional or other components to transmit and receive communication signals (e.g., receiver, transmitter, transceiver, etc.), and preferably implements wireless communication protocols (e.g., BLUETOOTH, etc.). However, any types of communication utilizing any communication protocols may be employed. For example, communication device 176 may employ conventional or other BLUETOOTH low energy (BLE) devices (e.g., BLUETOOTH beacons, etc.) to communicate with nearby portable electronic devices as described above.

Access device 180 may be implemented by any conventional or other remote control device for vehicle 170. The access device includes a hardware processor 182 (e.g., microprocessor, controller, central processing unit (CPU), etc. with one or more memories), one or more buttons 184, and a communication device 186. Processor 182 may be integrated with, or coupled to, communication device 186 to perform functions of the access device according to present invention embodiments. Communication device 186 may include any conventional or other components to transmit and receive communication signals (e.g., receiver, transmitter, transceiver, etc.), and preferably implements wireless communication protocols (e.g., BLUETOOTH, etc.). However, any types of communication utilizing any communication protocols may be employed. For example, communication device 186 may employ conventional or other BLUETOOTH low energy (BLE) devices (e.g., BLUETOOTH beacons, etc.) to communicate with nearby portable electronic devices as described above.

Buttons 184 each control a corresponding operation of vehicle 170. For example, the vehicle operations for an automotive vehicle may include operating the vehicle horn, operating vehicle lights, controlling vehicle windows or a sunroof, etc. Actuation of a button 184 of remote access device 180 directs processor 182 and communication device 186 to provide appropriate signals to communication device 176 of vehicle 170 to perform the corresponding vehicle operation.

Token 190 may be implemented by any conventional or other token or fob. The token includes a hardware processor 192 (e.g., microprocessor, controller, central processing unit (CPU), etc. with one or more memories), and a communication device 196. Processor 192 may be integrated with, or coupled to, communication device 196 to perform functions of the token according to present invention embodiments. Communication device 196 may include any conventional or other components to transmit and receive communication signals (e.g., receiver, transmitter, transceiver, etc.), and preferably implements wireless communication protocols (e.g., BLUETOOTH, etc.). However, any types of communication utilizing any communication protocols may be employed. For example, communication device 196 may employ conventional or other BLUETOOTH low energy (BLE) devices (e.g., BLUETOOTH beacons, etc.) to communicate with nearby portable electronic devices as described above.

The processors and/or communication devices of alert unit 150 and user devices 155 may include one or more modules or units to perform the various functions of present invention embodiments described below. These various modules may be implemented by any combination of any quantity of software and/or hardware modules or units, and may reside within memory of the alert unit and user devices for execution by a corresponding processor.

Alert unit 150 pairs or links to a user device 155 in order to provide notifications to a user when the user exceeds a desired distance from an entity as described below. For example, alert unit 150 may link to portable processing device 160 of a user. The portable processing device may determine the distance of the user from the alert unit (or entity) based on communication signals between the portable processing device and alert unit, and provide a notification to the user in response to the user exceeding a threshold distance. Alternatively, the alert unit may determine the distance of the user from the alert unit (or entity) based on communication signals between the portable processing device and alert unit, and provide a notification to a device of the user in response to the user exceeding a threshold distance.

Further, alert unit 150 may pair or link (e.g., via wireless or hard-wired communications) to vehicle 170 of a user. The vehicle determines the distance of access device 180 (e.g., remote control or fob for the vehicle, etc.) of the user from the vehicle (or alert unit or entity). In this case, vehicle 170 notifies alert unit 150 when the access device exceeds the threshold distance. The alert unit may direct the vehicle to perform an audio or visual operation (e.g., operate the horn, operate or flash vehicle lights, open windows, etc.) to provide a notification to the user. Alternatively, the vehicle may directly perform an audio or visual operation (e.g., operate the horn, operate or flash vehicle lights, open windows, etc.) to provide a notification to the user when the access device is determined to exceed the threshold distance.

Moreover, alert unit 150 may pair or link to access device 180 (e.g., remote control for the vehicle, etc.) of a user. The alert unit determines the distance of access device 180 of the user from the alert unit (or entity) based on communication signals between the alert unit and access device. When the distance exceeds the threshold distance, the alert unit directs the remote access device to initiate an audio or visual operation (e.g., operate the horn, operate or flash vehicle lights, open windows, etc.) of the vehicle to provide a notification to a user.

In addition, alert unit 150 may pair or link to token 190 of a user. The alert unit determines the distance of token 190 of the user from the alert unit (or entity) based on communication signals between the alert unit and token. When the distance exceeds the threshold distance, the alert unit may send a notification to a device of a user (e.g., text message, e-mail, provide an audible alarm, etc.).

Figure 1B:
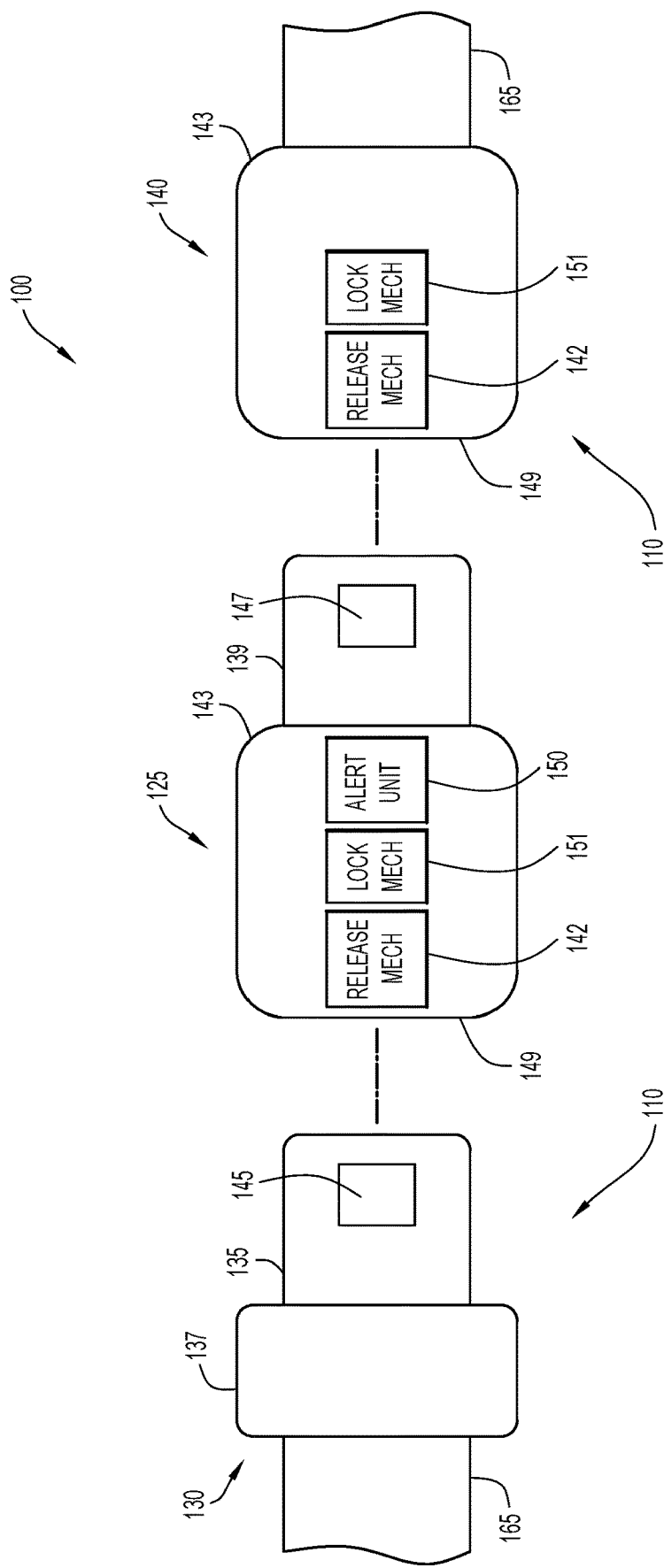
FIG. 1B is a diagrammatic illustration of an alternative embodiment of the entity alert system of FIG. 1A.

An alternative embodiment of receptacle 120 for use with a conventional securing device 110 is illustrated in FIG. 1B. Initially, securing device 110 is implemented by a conventional securing device for a vehicle, such as an automotive seat belt or restraint for a child safety seat. Securing device 110 includes engaging member 130 and a receiving member 140. The receiving member and engaging member are each secured to a distal end of a respective belt or strap 165 to secure, or be attached to, an entity within the vehicle or other environment. The respective belts 165 associated with the receiving member and engaging member may be different belts, or be different portions of a same elongated belt (e.g., to form a loop to secure or be attached to an entity, etc.) as described above.

Engaging member 130 is substantially similar to the engaging member described above, and includes generally rectangular base 137 attached to a distal end of a respective belt 165, and generally rectangular projection 135 extending distally of the base. The projection includes generally rectangular aperture 145 for engagement with receiving member 140. However, the projection and aperture may be of any size or shape, where the aperture may be defined in the projection at any location.

Receiving member 140 is attached to a distal end of a respective belt 165, and is similar to receptacle 120 described above. Receiving member 140 includes generally rectangular housing 143 with generally rectangular slot 149 defined therein to receive projection 135, and locking mechanism 151 disposed within the housing. The locking mechanism engages aperture 145 of projection 135 and secures engaging member 130 to receiving member 140. The receiving member further includes release mechanism or button 142 to enable the locking mechanism to release the projection of engaging member 130.

Receptacle 125 is substantially similar to receptacle 120 described above, and includes generally rectangular housing 143 with a generally rectangular slot 149 defined therein to receive projection 135, and locking mechanism 151 disposed within the housing. However, the housing and slot may be of any shape or size, and the slot may be defined at any location. The locking mechanism engages aperture 145 of projection 135 and secures the engaging member to receptacle 125. Receptacle 125 further includes a generally rectangular projection 139 extending from a distal end of the receptacle. Projection 139 is substantially similar to projection 135 and includes a generally rectangular aperture 147 for engagement with receiving member 140. However, the projection and aperture may be of any size or shape, where the aperture may be defined in the projection at any location.

Alert unit 150 is disposed within receptacle 125, and operates as described above in response to insertion of engaging member 130 within receptacle 125. Receptacle 125 receives and releasably secures projection 135 of the engaging member, while projection 139 of receptacle 125 is releasably secured by receiving member 140. In this fashion, receptacle 125 may be coupled to components of conventional securing devices to be utilized with those devices. Receptacle 125 further includes release mechanism or button 142 to enable the locking mechanism to release projection 135 of engaging member 130.

However, a similar arrangement may be utilized between any connectors of any suitable securing device (e.g., collar for an animal, band fastened to an item, clasp or clamp arrangement, etc.).

Figure 2A:
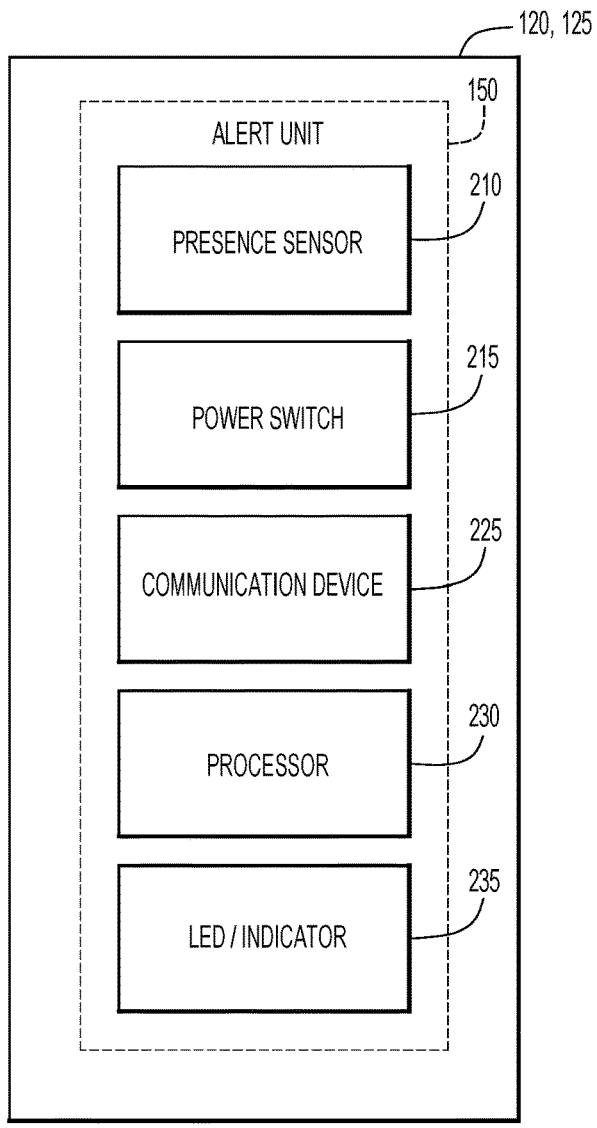
FIG. 2A is a block diagram of an alert unit to provide a notification to the user in response to the user exceeding a desired range from an environment according to an embodiment of the present invention.
Figure 2B:
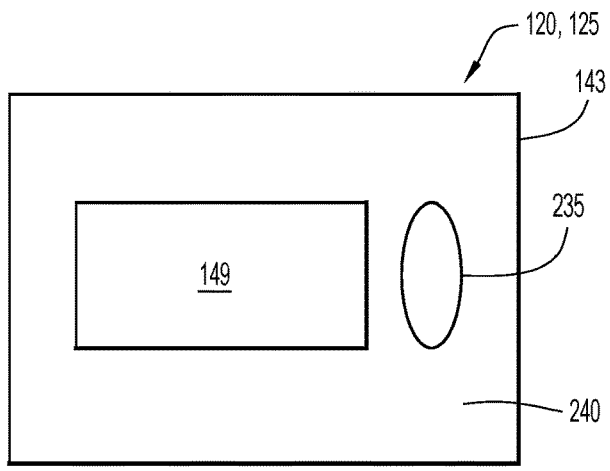
FIG. 2B is a front view in elevation of a receptacle housing the alert unit of FIG. 2A according to an embodiment of the present invention.

Referring to FIGS. 2A and 2B, alert unit 150 (FIG. 2A) is disposed within receptacle 120, 125, and includes a presence sensor 210, a power switch 215, communication device 225, processor 230, and an indicator 235. Power switch 215 may be implemented by any conventional or other switch, and enables (and disables) power to alert unit 150 in response to user manipulation of the power switch. A power source or supply may include a vehicle power system when receptacle 120 (and alert unit 150) are integrated with a vehicle securing device 110. Alternatively, the power source or supply may include a battery when receptacle 125 is employed (as an individual unit) with a conventional securing device.

Presence sensor 210 detects the presence (or insertion/removal) of projection 135 of engaging member 130 within receptacle 120, 125. Receptacle 120, 125 includes slot 149 (FIG. 2B) defined in a front surface 240 of housing 143 to receive projection 135 of engaging member 130. Operation of alert unit 150 is initiated in response to presence sensor 210 detecting the presence (or insertion) of projection 135 within receptacle 120, 125, while alert unit operation is disabled when the presence sensor detects the absence (or removal) of projection 135 within receptacle 120, 125.

Indicator 235 is disposed on front surface 240 of housing 143 of receptacle 120, 125 adjacent slot 149. The indicator may be implemented by any conventional or other visual indicator (e.g., light emitting diode (LED), etc.). Indicator 235 may provide a color-coded scheme to indicate a status of alert unit 150. For example, indicator 235 may be illuminated red in response to activation of the alert unit by a detection of presence sensor 210, but prior to pairing or linking with a user device 155. The indicator may subsequently be illuminated green to indicate successful pairing or linking with user device 155. However, any suitable colors may be utilized to indicate corresponding statuses of alert unit 150.

Processor 230 may be implemented by any conventional or other processing device (e.g., microprocessor, controller, central processing unit (CPU), etc.), and may be integrated with, or coupled to, communication device 225 to perform functions of the alert unit of present invention embodiments. Communication device 225 provides communication with user devices 155, and enables alert unit 150 to pair or link with those user devices. This is preferably accomplished with seamless integration, where no additional configuration is needed to pair and activate alert unit 150. Communication device 225 may include any conventional or other components to transmit and receive communication signals (e.g., receiver, transmitter, transceiver, etc.), and preferably implements wireless communication protocols (e.g., BLUETOOTH, etc.). However, any types of communication utilizing any communication protocols may be employed. For example, communication device 225 may employ conventional or other BLUETOOTH low energy (BLE) devices (e.g., BLUETOOTH beacons, etc.) to communicate with nearby portable electronic devices as described above.

The communication device is activated when engaging member 130 is inserted into receptacle 120, 125 as described above. Once this occurs, communication device 225 (and/or processor 230) tracks distance between alert unit 150 and a user device 155 (e.g., portable processing device 160, remote access device 180, token 190, etc.). This may be accomplished by continuously communicating with user device 155 to confirm the user device resides within a specified distance (or radius) from alert unit 150 (e.g., in a range of approximately five to eight feet, etc.) using a beacon implementation approach. Alert unit 150 may be preconfigured to the specified threshold distance. In other words, user device 155 pairs with alert unit 150 and, using BLUETOOTH low energy beacon (or similar distance threshold checking) techniques, the alert unit persistently communicates with user device 155. Communication device 225 is deactivated once engaging member 130 is decoupled from receptacle 120, 125 as described above.

A notification is triggered once user device 155 exceeds the specified threshold distance from alert unit 150. The notification may include any type of notification to gain attention of the user (e.g., vehicle horn, SMS message, audible sound, visual indication, vibration or other haptic feedback, etc.). When user device 155 includes an access device 180 including a vehicle remote control, alert unit 150 may utilize vehicle operations to broadcast a notification (e.g. alarm or horn audible sound, etc.). Alternatively, when alert unit 150 is paired or linked with a mobile processing device 160, the notification (e.g. sound, vibration, SMS text message, e-mail, etc.) is provided by the mobile processing device itself.

In addition, alert unit 150 may trigger an emergency broadcast to a preconfigured destination when the user exceeds the specified distance for an extended duration. This may include integration with a vehicle on-board monitoring system, cellular SMS broadcast to emergency responders, notifications to a configured person, and notification of global positioning system (GPS) coordinates.

Figure 3:
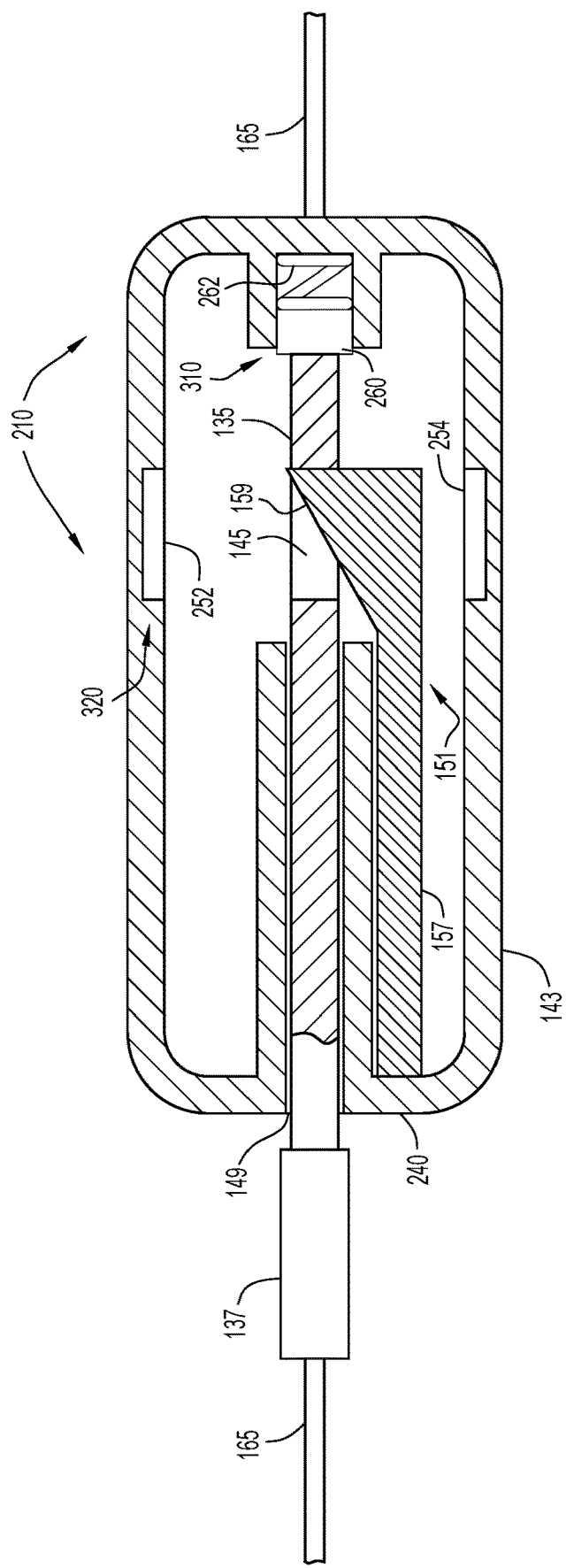
FIG. 3 is a side view in elevation and partial section of the receptacles of FIGS. 1A and 1B with alternative sensor arrangements to detect a presence of an engaging member according to embodiments of the present invention.

Various sensor arrangements may be employed to detect the presence of engaging member 130 within receptacle 120, 125 as illustrated in FIG. 3. Initially, receptacle 120, 125 includes housing 143 with slot 149 defined in front housing surface 240 as described above (FIG. 2B). Projection 135 of engaging member 130 is disposed through slot 149 and into receptacle 120, 125 to be secured by locking mechanism 151 and activate alert unit 150 as described above. Locking mechanism 151 includes a generally rectangular platform 157 with a protruding member 159 extending from a top surface of the platform. The protruding member includes dimensions sufficient to be inserted within aperture 145 of projection 135. As projection 135 is inserted into receptacle 120, 125, platform 157 is urged slightly downward enabling protruding member 159 to be disposed within aperture 145 to secure the engaging member within receptacle 120, 125. Depression of release mechanism or button 142 forces platform 157 away from projection 135, thereby withdrawing protruding member 159 from aperture 145 and releasing projection 135. Locking mechanism 151 may be implemented by any conventional or other fastening mechanism (e.g., for seat belts, child safety seats, etc.), and may include any desired mechanical components to releasably engage the projection (e.g., springs, levers, posts, gripping members, hooks, etc.).

Presence sensor 210 may include a mechanical (or physical) switch 310 that is disposed on a rear housing wall opposite slot 149. Switch 310 is depressed by insertion of projection 135 into receptacle 120, 125 to enable alert unit 150. Switch 310 includes a body 260 and a resilient member or spring 262 that biases body 260 toward front surface 240, thereby opening switch 310 (and preventing power to alert unit 150). When projection 135 is inserted into receptacle 120, 125 and locking mechanism 151, the projection applies force to body 260 to overcome the bias of resilient member 262 and close switch 310 (to enable power to alert unit 150). In other words, as projection 135 is inserted past the locking mechanism, body 260 of switch 310 is depressed by projection 135 (and/or locking mechanism 151) to close switch 310 and enable alert unit 150. When projection 135 is removed from receptacle 120, 125 and locking mechanism 151, resilient member 262 biases body 260 toward front surface 240, thereby opening switch 310 (to disable power to alert unit 150).

Alternatively, presence sensor 210 may include an energy sensor 320 to detect the presence of projection 135 within receptacle 120, 125. Energy sensor 320 includes an emitter 252 and a receiver 254 disposed in proximity of locking mechanism 151 and on opposing interior surfaces of housing 143 (e.g., top and bottom interior surfaces, opposing interior side surfaces, etc.), preferably at least partially coincident each other. Emitter 252 may emit any desired form of energy (e.g., light, magnetic, radio or other waves, etc.), while receiver 254 may detect energy emitted from emitter 252. The emitter and receiver may be implemented by any conventional or other emitters and receivers.

By way of example, receiver 254 is configured to disable power (e.g., open a switch, etc.) to alert unit 150 when energy from emitter 252 is detected. Accordingly, when projection 135 is absent from receptacle 120, 125, energy emitted from emitter 252 is received or detected by receiver 254. In this case, receiver 254 disables power to alert unit 150.

When projection 135 is inserted into slot 149 of receptacle 120, 125, the projection is disposed between emitter 252 and receiver 254, thereby blocking the emitted energy. In this case, receiver 254 does not detect the emitted energy from emitter 252, and enables power (e.g., closes a switch, etc.) to alert unit 150. However, the receiver may be configured to control power to the alert unit based on any desired conditions. In addition, presence sensor 210 may include any quantity of any types of sensors and/or switches (e.g., contact, magnetic, light sensor, etc.) to detect the presence of projection 135 within receptacle 120, 125 and control activation of alert unit 150.

Presence sensor 210 activates alert unit 150 once projection 135 is inserted into receptacle 120, 125, preferably to a point where the projection is latched and cannot be removed without depressing release mechanism 142. Activation of alert unit 150 triggers the process for pairing or linking with a user device 155.

Figure 4:
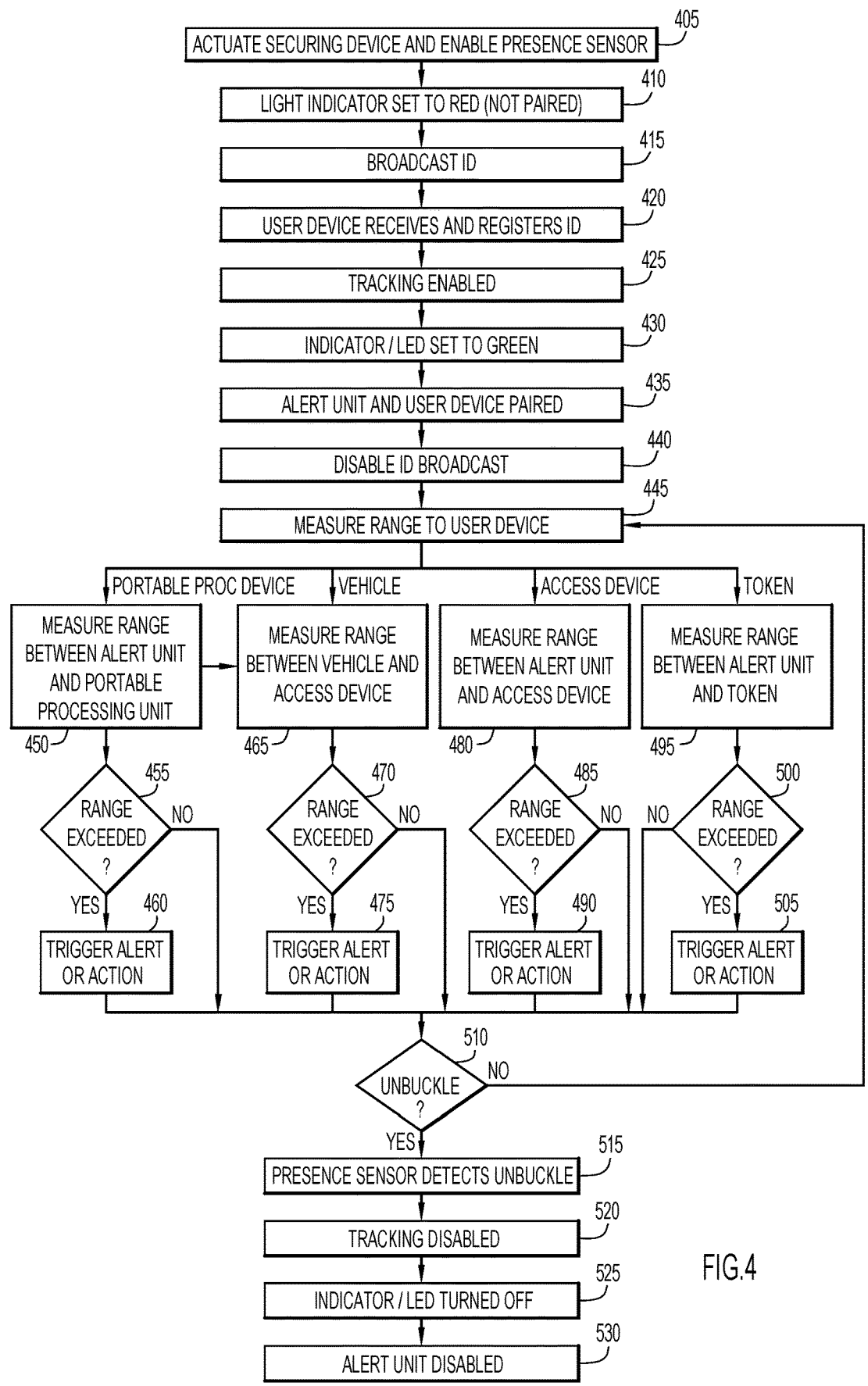
FIG. 4 is a procedural flowchart of a manner of detecting an entity within an environment and notifying a user according to an embodiment of the present invention.

A manner of detecting an entity within an environment and notifying a user according to an embodiment of the present invention is illustrated in FIG. 4. Initially, an application or software module to perform the entity detection and notification as described below is installed on processor 230 of alert unit 150, portable processing device 160, and/or processor 172 of vehicle 170. Default settings may be configured or updated (e.g., specified or threshold distance, communication settings, etc.) for operation.

An entity is engaged by securing device 110 within a vehicle or other environment at step 405, where projection 135 of the engaging member is inserted into and secured by receptacle 120, 125 as described above. The entity may be a person (e.g., child, adult, etc.) secured with an automotive seat belt or child safety seat. Alternatively, the securing device may be a band secured to an item (e.g., perishable or valuable item, a collar for an animal, etc.) within the vehicle or other environment via any conventional or other interlocking components (e.g., with the alert unit and presence sensor disposed in the interlocking components, etc.). Presence sensor 210 detects the actuation of the securing device (e.g., presence of projection 135 within receptacle 120, 125, etc.), and enables alert unit 150.

The alert unit illuminates indicator 235 at step 410 to indicate a status (e.g., red to indicate enablement of the alert unit and prior to pairing or linking with a user device 155). Once enabled, communication device 225 of alert unit 150 broadcasts a unique identifier (e.g., universally unique identifier (UUID), etc.) to initiate pairing or linking with a user device 155 (e.g., portable processing device 160, vehicle 170, access device 180, or token 190) at step 415.

User device 155 registers the unique identifier from the alert unit at step 420. For example, communication device 166 and processor 162 of portable processing device 160 may receive and process the broadcasted identifier. A user of the portable processing device may enter information to acknowledge and accept pairing with alert unit 150. Portable processing device 160 may store the unique identifier for automatic pairing with alert unit 150 for subsequent instances. Further, vehicle 170, access device 180, and token 190 may automatically perform the registration and acknowledgement (e.g., via respective processors and communication devices of the vehicle, access device, and token).

Once the identifier is acknowledged, alert unit 150 enables communication and/or tracking of user device 155 at step 425 based on transferred communication signals as described below. The alert unit adjusts indicator 235 at step 430 to indicate an updated status of the alert unit, and provide notification of pairing with user device 155 (e.g., indicator 235 is changed to green to indicate pairing, etc.). Alert unit 150 and user device 155 are paired at step 435, and the alert unit terminates broadcasting the unique identifier (e.g., universally unique identifier (UUID), etc.) at step 440 to prevent linking or pairing with other devices.

The user is preferably in possession of portable processing device 160, remote access device 180, or token 190 to enable a distance to be measured between the user and entity in the vehicle or other environment. The range or distance to user device 155 (or user) is measured at step 445.

When alert unit 150 pairs or links with portable processing device 160 of the user, the portable processing device may determine the distance of the user (or portable processing device 160) from the entity (or alert unit 150) at step 450. For example, in a beacon mode of operation, communication device 225 of alert unit 150 repeatedly transmits (e.g., at periodic or other intervals, etc.) the unique identifier and other information, including transmitted signal power at a predetermined distance. Since signal strength is proportional to distance (e.g., signal strength generally varies in proportion to the square of the distance, etc.), the range between the user and alert unit may be determined by processor 162 and communication device 166 of the portable processing device based on the signal power information and a measured signal strength of the communication signals received by communication device 166 of the portable processing device from communication device 225 of alert unit 150.

Further, communication device 225 may be configured to have a transmission range corresponding to the permitted distance for the user (e.g., preferably any distance or range within five to twenty feet). When communication device 166 of the portable processing device fails to detect communication signals from communication device 225 of the alert unit (e.g., after pairing, etc.), this indicates that the user is beyond the permitted distance. Communication device 166 (and/or processor 162) may employ any conventional or other components and techniques to measure the signal strength and determine the distance (e.g., a receiver, conventional or other relationships or formulas, etc.).

Alternatively, alert unit 150 may determine the distance of portable processing device 160 of the user from alert unit 150 (or entity) at step 450. In this case, communication device 166 of the portable processing device operates in a beacon mode and repeatedly transmits (e.g., at periodic or other intervals, etc.) the unique identifier and other information, including transmitted signal power at a predetermined distance. The range between the user and alert unit may be determined by processor 230 and communication device 225 of the alert unit based on the signal power information and a measured signal strength of the communication signals received by communication device 225 of alert unit 150 from communication device 166 of portable processing device 160 as described above. Further, communication device 166 may be configured to have a transmission range corresponding to the permitted distance for the user. When communication device 225 of the alert unit fails to detect communication signals from communication device 166 of the portable processing device (e.g., after pairing, etc.), this indicates that the user is beyond the permitted distance. Communication device 225 (and/or processor 230) may employ any conventional or other components and techniques to measure the signal strength and determine the distance (e.g., receiver, conventional or other relationships or formulas, etc.).

When the distance exceeds a distance threshold (or permissible range for the user, preferably any distance or range within five to twenty feet) as determined at step 455, a notification is provided to the user at step 460. The notification basically indicates to the user that an entity (e.g., person, animal, item, etc.) is present within the vehicle or other environment, and may be configured based on settings in the installed application or software module.

For example, portable processing device 160 may determine the distance of the user from the alert unit (or entity) has exceeded the specified or permitted distance (e.g., a comparison indicating that the determined distance exceeds the specified distance, failure to detect communication signals, etc.). The portable processing device may be awoken from a suspended or stand-by state (even if the application or software module is not being executed), and provide a notification to the user in response to the user exceeding the specified distance. The notification may include an SMS message, audible sound, visual indication, vibration or other haptic feedback, etc.

Alternatively, alert unit 150 may determine that the distance of portable processing device 160 of the user from the alert unit (or entity) has exceeded the specified distance (e.g., a comparison indicating that the determined distance exceeds the specified distance, failure to detect communication signals, etc.), and may send a notification to the user (e.g., text message, e-mail, provide an audible alarm, telephone call, etc.) via the portable processing device.

When alert unit 150 pairs or links to vehicle 170 of a user (from step 445), the vehicle determines the distance of access device 180 (e.g., remote control or fob for the vehicle, etc.) of the user from the vehicle (or alert unit 150 or entity) at step 465. For example, in a beacon mode of operation, communication device 186 of the access device repeatedly transmits (e.g., at periodic or other intervals, etc.) the unique identifier and other information, including transmitted signal power at a predetermined distance. Since signal strength is proportional to distance (e.g., signal strength generally varies in proportion to the square of the distance, etc.), the range between the user and vehicle may be determined by processor 172 and communication device 176 of vehicle 170 based on the signal power information and a measured signal strength of the communication signals received by communication device 176 of the vehicle from communication device 186 of access device 180.

Further, communication device 186 of access device 180 may be configured to have a transmission range corresponding to the permitted distance for the user. When communication device 176 of the vehicle fails to detect communication signals from communication device 186 of the access device (e.g., after pairing, etc.), this indicates that the user is beyond the permitted distance. Communication device 176 (and/or processor 172) may employ any conventional or other components and techniques to measure the signal strength and determine the distance (e.g., a receiver, conventional or other relationships or formulas, etc.).

The determined distance (or lack of detection of communication signals) may be provided from vehicle 170 to alert unit 150 to provide a notification. When the access device exceeds the specified distance as determined at step 470, a notification is provided to the user at step 475. The notification basically indicates to the user that an entity (e.g., person, animal, item, etc.) is present within the vehicle or other environment, and may be configured based on settings in the installed application or software module. For example, alert unit 150 may pair or link with and direct the vehicle to perform an audio or visual operation (e.g., operate the horn, operate or flash vehicle lights, open windows, etc.) to provide a notification to the user. Alternatively, vehicle 170 may directly provide the notification (e.g., operate the horn, operate or flash vehicle lights, open windows, etc.) in response to determining the distance to the user exceeded the specified distance.

When alert unit 150 pairs or links to access device 180 (e.g., remote control for the vehicle, etc.) of a user (from step 445), the alert unit determines the distance of access device 180 of the user from alert unit 150 (or entity) at step 480. For example, in a beacon mode of operation, communication device 186 of the access device repeatedly transmits (e.g., at periodic or other intervals, etc.) the unique identifier and other information, including transmitted signal power at a predetermined distance. Since signal strength is proportional to distance (e.g., signal strength generally varies in proportion to the square of the distance, etc.), the range between the user and alert unit may be determined by processor 230 and communication device 225 of alert unit 150 based on the signal power information and a measured signal strength of the communication signals received by communication device 225 of the alert unit from communication device 186 of the access device.

Further, communication device 186 of access device 180 may be configured to have a transmission range corresponding to the permitted distance for the user. When communication device 225 of the alert unit fails to detect communication signals from communication device 186 of the access device (e.g., after pairing, etc.), this indicates that the user is beyond the permitted distance. Communication device 225 (and/or processor 230) may employ any conventional or other components and techniques to measure the signal strength and determine the distance (e.g., a receiver, conventional or other relationships or formulas, etc.).

When access device 180 of the user has exceeded the specified distance as determined at step 485, a notification is provided to the user at step 490. The notification basically indicates to the user that an entity (e.g., person, animal, item, etc.) is present within the vehicle or other environment, and may be configured based on settings in the installed application or software module. For example, alert unit 150 may determine the distance of the access device from the alert unit (or entity) has exceeded the specified or permitted distance (e.g., a comparison indicating that the determined distance exceeds the specified distance, failure to detect communication signals, etc.). Alert unit 150 may direct access device 180 to initiate an audio or visual operation (e.g., operate the horn, operate or flash vehicle lights, open windows, etc.) of the vehicle (corresponding to functions of buttons of 184) to provide a notification to the user.

When alert unit 150 pairs or links to token 190 of a user (from step 445), the alert unit determines the distance of token 190 of the user from alert unit 150 (or entity) at step 495. For example, in a beacon mode of operation, communication device 196 of the token repeatedly transmits (e.g., at periodic or other intervals, etc.) the unique identifier and other information, including transmitted signal power at a predetermined distance. Since signal strength is proportional to distance (e.g., signal strength generally varies in proportion to the square of the distance, etc.), the range between the user and alert unit may be determined by processor 230 and communication device 225 of alert unit 150 based on the signal power information and a measured signal strength of the communication signals received by communication device 225 of the alert unit from communication device 196 of the token.

Further, communication device 196 of token 190 may be configured to have a transmission range corresponding to the permitted distance for the user. When communication device 225 of the alert unit fails to detect communication signals from communication device 196 of the token (e.g., after pairing, etc.), this indicates that the user is beyond the permitted distance. Communication device 225 (and/or processor 230) may employ any conventional or other components and techniques to measure the signal strength and determine the distance (e.g., a receiver, conventional or other relationships or formulas, etc.).

When the distance of token 190 of the user from the alert unit (or entity) has exceeded the specified distance as determined at step 500, a notification is provided to the user at step 505. The notification basically indicates to the user that an entity (e.g., person, animal, item, etc.) is present within the vehicle or other environment, and may be configured based on settings in the installed application or software module. For example, alert unit 150 may determine the distance of the token from the alert unit (or entity) has exceeded the specified or permitted distance (e.g., a comparison indicating that the determined distance exceeds the specified distance, failure to detect communication signals, etc.). Alert unit 150 may send a notification to a device of the user (e.g., text message, e-mail, provide an audible alarm, telephone call, etc.).

Once the notification is provided (at steps 460, 475, 490, or 505), or the distance between the user and entity has not exceeded the specified distance (as determined at steps 455, 470, 485, or 500), securing device 110 is examined at step 510. When actuation of securing device 110 is still detected by presence sensor 210, the distance between the user and entity is monitored at step 445 as described above.

If securing device 110 is no longer actuated (e.g., projection 135 is removed from receptacle 120, 125, etc.) as determined at step 510, presence sensor 210 detects this condition at step 515, and alert unit 150 disables communication and/or tracking with user device 155 (e.g., portable processing device 160, vehicle 170, access device 180, or token 190) at step 520. The alert unit further disables power to indicator 235 at step 525 to indicate disablement of the alert unit, and terminates operation at step 530. The alert unit may further send a notification to user device 155 (e.g., portable processing device 160, vehicle 170, etc.) prior to disablement to indicate to the user that the alert unit is powering off.

The user may take various actions in response to the notification. For example, the user may remove the entity (e.g., child, item, animal, etc.) from the environment, control the vehicle to provide safer conditions (e.g., operate windows, sunroof, etc.), etc.

It will be appreciated that the embodiments described above and illustrated in the drawings represent only a few of the many ways of implementing embodiments for entity detection and alert notification.

The environment of the present invention embodiments may include any number of computer or other processing devices (e.g., portable processing device, access device, token, vehicle, etc.) and databases or other repositories arranged in any desired fashion, where the present invention embodiments may be applied to any desired type of computing or processing environment. The portable processing device employed by the present invention embodiments may be implemented by any number of any personal or other type of computer or processing system (e.g., laptop, PDA, mobile devices, smartphone, etc.), and may include any commercially available operating system and any combination of commercially available and custom software (e.g., communications software, applications or software modules for range detection and notification, etc.). These devices may include any types of monitors and input devices (e.g., keyboard, mouse, voice recognition, etc.) to enter and/or view information.

The processors of the alert unit and target devices may be implemented by any quantity of any computing device (e.g., microprocessor, controller, central processing unit (CPU), etc.), where the processors may include or be associated with one or more memories to store the applications and/or software modules and data.

It is to be understood that the applications and/or software modules of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computing devices and/or processors of the present invention embodiments may alternatively be implemented by any type of hardware and/or other processing circuitry.

The various functions of the computing devices and/or processors may be distributed in any manner among any number of software and/or hardware modules or units, processing devices or computer systems and/or circuitry, where the processing devices or computer systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the alert unit and various target or user devices, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The applications and/or software modules of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication devices may be implemented by any number of any type of wired or wireless communication devices with any suitable components arranged in any fashion (e.g., transmitter, receiver, transceiver, processor, etc.). The communication devices may employ any desired communication protocols (e.g., BLUETOOTH, etc.), and may transmit and receive any types of communication signals at any desired frequencies.

The system may employ any number of any conventional or other databases, data stores or storage structures to store information (e.g., unique identifier, notifications, configuration and/or settings, etc.).

The present invention embodiments may employ any number of any type of user interface (e.g., Graphical User Interface (GUI), command-line, prompt, etc.) for obtaining or providing information (e.g., notifications, acknowledge pairing or linking devices, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for detecting any entity within any environment and providing any desired notification to a user when the user is outside a desired range. The alert unit may communicate with any quantity of any desired target or other devices within possession of a corresponding user (or on a corresponding user's person) (e.g., portable processing device, remote access device, token, vehicle, etc.) to notify the corresponding user and/or detect a corresponding user range. The vehicle may communicate with any quantity of any desired target or other devices within possession of a corresponding user (or on a corresponding user's person) (e.g., portable processing device, remote access device, token, etc.) to notify the corresponding user and/or detect a corresponding user range in substantially the same manner described above. The alert unit and presence sensor may be disposed in one or more connecting components of any type of securing, fastening, or restraint device (e.g., seat belt, restraint of a child safety seat, connecting components of a band secured to an item, animal collar or harness, etc.).

The housing of the receptacle may be of any shape or size, and utilize any conventional or other locking mechanism and release mechanism (e.g., button, etc.). The alert unit, locking mechanism, and presence sensor may be arranged in the housing in any desired fashion. The slot may be of any shape or size, and defined in the housing at any suitable location. The presence sensor may be implemented by any type of physical or mechanical switch (e.g., lever, switch, contacts, etc.) or electronic sensor (e.g., any type of emitted energy, such as light, radio waves, etc.) to detect actuation of the securing device (e.g., engaging and disengaging of the connecting components, etc.). The distal projection of the receptacle may be of any shape or size sufficient to engage a conventional securing device (e.g., seat belt, clamp or clasp, etc.).

The indicator may include any type of device to provide a visual or audio signal to indicate a status of the alert unit (e.g., LED or other light, audio device, etc.). The visual or audio signal may be adjusted in any fashion to indicate different statuses of the alert device (e.g., different colors, different audio signals, flashing light, etc.).

The notification may be of any type and provided by any device (e.g., portable processing device, vehicle, external device, device of an associate of the user, etc.) to alert a user of an entity in the environment. The notification may include a textual or audio message, visual or audio indication, etc. Further, any vehicle operation may be utilized to provide a notification to the user (e.g., operating the horn, operating windows, operating (or flashing) vehicle headlights or flashers, etc.). The alert unit may be automatically enabled in response to actuation of the securing device or other conditions (e.g., turning off or locking the vehicle, etc.). Alternatively, the alert unit may be enabled manually via a power or other switch (e.g., locally actuated, actuated via a remote device, etc.).

The range to the user may be determined based on any suitable conditions and information. For example, signal strength of any types of signals (e.g., BLUETOOTH beacon signals, RF signals, etc.) may be used to determine the range. Further, a predetermined transmission range corresponding to the permitted distance may be employed, where failure to detect the transmitted signals indicates a user beyond a permissible range. In addition, GPS or other location information may be exchanged between paired or linked devices, and the distance determined based on the location information associated with each of those devices. The threshold distance is preferably any distance or range within five to twenty feet, but may be any desired distance, distance range, or quantity of distance units (e.g., feet, yards, etc.). The distance may be compared to (or satisfy) the threshold distance in any desired fashion (e.g., less than, less than or equal to, greater than, greater than or equal to, equal to, etc.) to provide a notification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for providing a notification to a user comprising:
   a receptacle to receive an engaging member of a securing device, wherein the securing device engages an entity within an environment of a vehicle and the receptacle includes a sensor to detect a presence of the engaging member of the securing device within the receptacle; and
   an alert unit disposed within the receptacle and enabled in response to presence of the engaging member of the securing device within the receptacle, wherein the alert unit comprises:
      a communication device to communicate with one or more target devices associated with the user, wherein the one or more target devices include a remote access device for the vehicle in possession of the user and enabling performance of vehicle operations; and a processor configured to determine a distance to the user based on communication with the one or more target devices and control notification to the user in response to the distance to the user satisfying a threshold distance, wherein controlling notification to the user comprises the processor of the alert unit controlling the remote access device to transmit signals to the vehicle to direct the vehicle to perform one or more vehicle operations to provide the notification to the user, and wherein the one or more vehicle operations include operating a vehicle horn and operating vehicle lights.

2. The system of claim 1, wherein the receptacle includes a second engaging member and the securing device includes a second receptacle to receive the second engaging member.

3. The system of claim 1, wherein the one or more target devices further include a portable processing device that provides the notification to the user in response to the distance to the user satisfying the threshold distance, wherein the notification includes one or more from a group of: a message, an audio alert, a visual alert, and a vibration alert.

4. The system of claim 1, wherein the one or more target devices further include the vehicle that determines the distance to the user as a distance between the vehicle and an object in possession of the user, wherein the vehicle provides the notification to the user in response to the distance to the user determined by the vehicle satisfying the threshold distance.

5. The system of claim 1, wherein the one or more target devices further include a token in possession of the user, and wherein the alert unit provides the notification to the user in response to the distance to the user satisfying the threshold distance.

6. The system of claim 1, wherein the securing device includes a seat belt.

7. The system of claim 1, wherein the securing device includes a restraining belt of a child safety seat.

8. The system of claim 1, wherein the communication device includes a wireless communication device.

9. The system of claim 1, wherein the environment includes an interior of an automotive vehicle.

10. A method of providing a notification to a user comprising:
  detecting a presence of an engaging member of a securing device within a receptacle of the securing device via a sensor, wherein the securing device engages an entity within an environment of a vehicle;
  enabling an alert unit disposed within the receptacle in response to presence of the engaging member of the securing device within the receptacle and communicating with one or more target devices associated with the user from the alert unit, wherein the one or more target devices include a remote access device for the vehicle in possession of the user and enabling performance of vehicle operations;
  determining, via a processor of the alert unit, a distance to the user based on communication with the one or more target devices; and
  controlling notification to the user in response to the distance to the user satisfying a threshold distance, wherein controlling notification to the user comprises the processor of the alert unit controlling the remote access device to transmit signals to the vehicle to direct the vehicle to perform one or more vehicle operations to provide the notification to the user, and wherein the one or more vehicle operations include operating a vehicle horn and operating vehicle lights.

11. The method of claim 10, wherein the receptacle includes a second engaging member and the securing device includes a second receptacle to receive the second engaging member.

12. The method of claim 10, wherein the one or more target devices further include a portable processing device, and controlling notification to the user further comprises:
  facilitating notification to the user from the portable processing device in response to the distance to the user satisfying the threshold distance, wherein the notification includes one or more from a group of: a message, an audio alert, a visual alert, and a vibration alert.

13. The method of claim 10, wherein the one or more target devices further include the vehicle, and determining the distance further comprises:
  determining, via the vehicle, the distance to the user as a distance between the vehicle and an object in possession of the user; and
  wherein controlling notification to the user further comprises:
  providing the notification to the user via the vehicle in response to the distance to the user determined by the vehicle satisfying the threshold distance.

14. The method of claim 10, wherein the one or more target devices further include a token in possession of the user, and wherein controlling notification to the user further comprises:
  providing the notification to the user from the alert unit in response to the distance to the user satisfying the threshold distance.

15. The method of claim 10, wherein the securing device includes a seat belt.

16. The method of claim 10, wherein the securing device includes a restraining belt of a child safety seat.

17. The method of claim 10, wherein communicating with the one or more target devices utilizes wireless communication.

18. The method of claim 10, wherein the environment includes an interior of an automotive vehicle.

* * * * *